(12) United States Patent
Hiller et al.

(10) Patent No.: US 9,702,485 B2
(45) Date of Patent: Jul. 11, 2017

(54) COVERS FOR ELECTRICAL DISTRIBUTION LINES AND INSULATORS AND METHODS AND SYSTEMS INCLUDING SAME

(71) Applicant: Tyco Electronics Corporation, Berwyn, PA (US)

(72) Inventors: Laura Jackson Hiller, Cary, NC (US); David Edwin Bowling, Fuquay-Varina, NC (US); John Anthony Newman, Fuquay-Varina, NC (US)

(73) Assignee: TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 14/956,607

(22) Filed: Dec. 2, 2015

(65) Prior Publication Data

US 2016/0172829 A1    Jun. 16, 2016

Related U.S. Application Data

(60) Provisional application No. 62/090,056, filed on Dec. 10, 2014.

(51) Int. Cl.
*H01B 17/00* (2006.01)
*F16L 3/26* (2006.01)
(Continued)

(52) U.S. Cl.
CPC ...... *F16L 3/26* (2013.01); *F16L 3/02* (2013.01); *H02G 7/00* (2013.01)

(58) Field of Classification Search
CPC ..... F16L 3/26; F16L 3/02; H02G 7/00; H02G 3/0418; H02G 3/0437
(Continued)

(56) References Cited

U.S. PATENT DOCUMENTS

| 881,682 A | 3/1908 | Harrison et al. |
| 983,039 A | 1/1911 | Field |

(Continued)

FOREIGN PATENT DOCUMENTS

| DE | 2812524 A1 | 9/1979 |
| DE | 8523201 U1 | 10/1985 |

(Continued)

OTHER PUBLICATIONS

"MVLC Medium Voltage Line Cover" TE Connectivity Energy, 1308377 E113 Apr. 2011 (2 pages).
(Continued)

*Primary Examiner* — Todd M Epps
(74) *Attorney, Agent, or Firm* — Myers Bigel, P.A.

(57) ABSTRACT

A protective conductor cover for a distribution line conductor includes an elongate cover body having a longitudinal axis and including first and second opposed, elongate sidewalls. The sidewalls define an axially extending cover channel terminating at axially opposed end openings, and an axially extending bottom opening communicating with the cover channel and terminating at the axially opposed end openings. The protective conductor cover further includes an integral conductor retention tab having a base end attached to the first sidewall and extending laterally from the first sidewall into the cover channel to a free terminal end of the conductor retention tab. The conductor retention tab is configured to elastically deflect and secure the conductor in the cover channel when the conductor is inserted into the cover channel through the bottom opening.

20 Claims, 8 Drawing Sheets

(51) Int. Cl.
*F16L 3/02* (2006.01)
*H02G 7/00* (2006.01)

(58) Field of Classification Search
USPC .......... 248/49; 174/68.1, 66, 172, 174, 181, 174/5 R, 138 F, 50, 168
See application file for complete search history.

(56) References Cited

U.S. PATENT DOCUMENTS

| | | | |
|---|---|---|---|
| 992,738 A | 5/1911 | Marshall |
| 1,141,674 A | 6/1915 | Withers |
| 1,180,729 A | 7/1916 | Marshall |
| 1,224,970 A | 5/1917 | Singer |
| 1,485,994 A | 3/1924 | Salisbury |
| 1,766,636 A | 6/1930 | Holzel |
| 2,234,391 A | 3/1941 | Taylor |
| 2,263,319 A | 11/1941 | Treanor |
| 2,408,253 A | 9/1946 | Diebold |
| 2,617,378 A | 11/1952 | Osol |
| 2,682,591 A | 6/1954 | Killian |
| 2,770,667 A | 11/1956 | Runde |
| 2,840,631 A | 6/1958 | Marcroft |
| 2,875,267 A | 2/1959 | Sutton, Jr. |
| RE24,613 E | 3/1959 | Hageltorn |
| 2,927,146 A | 3/1960 | Salisbury |
| 2,999,479 A | 9/1961 | Carder |
| 3,005,436 A | 10/1961 | Caldwell |
| 3,016,034 A | 1/1962 | Raistakka |
| 3,042,736 A | 7/1962 | Salisbury |
| 3,056,376 A | 10/1962 | Bender |
| 3,079,457 A | 2/1963 | Newcomb, Jr. |
| 3,089,915 A | 5/1963 | Plummer |
| 3,238,291 A | 3/1966 | Bosch et al. |
| 3,270,120 A | 8/1966 | Van Name et al. |
| 3,328,511 A | 6/1967 | Cagle et al. |
| 3,428,742 A | 2/1969 | Smith |
| 3,459,870 A | 8/1969 | Plummer |
| 3,510,568 A | 5/1970 | Cochran |
| 3,517,702 A | 6/1970 | Mueller et al. |
| 3,587,657 A | 6/1971 | Staller |
| 3,639,681 A | 2/1972 | Ettlinger |
| 3,682,434 A | 8/1972 | Boenig |
| 3,692,927 A | 9/1972 | Ellaschuk |
| 3,786,171 A | 1/1974 | Shira |
| 3,835,238 A | 9/1974 | West |
| 3,846,575 A | 11/1974 | Troy |
| 3,900,697 A | 8/1975 | Yotsugi |
| 3,900,698 A | 8/1975 | Yotsugi |
| 4,053,707 A | 10/1977 | Ely et al. |
| 4,201,883 A | 5/1980 | Shepherd |
| 4,234,753 A | 11/1980 | Clutter |
| 4,243,628 A | 1/1981 | Herold |
| 4,255,610 A | 3/1981 | Textoris |
| 4,280,013 A | 7/1981 | Clutter |
| 4,391,303 A | 7/1983 | Holgersson |
| 4,399,840 A | 8/1983 | Lee |
| 4,422,478 A | 12/1983 | Pentney et al. |
| 4,433,630 A | 2/1984 | Laborie |
| 4,453,353 A | 6/1984 | Killop et al. |
| 4,467,387 A | 8/1984 | Bergh et al. |
| 4,581,481 A | 4/1986 | Moretti |
| 4,628,145 A | 12/1986 | Kolcio et al. |
| 4,731,507 A | 3/1988 | Torimoto et al. |
| 4,845,307 A | 7/1989 | Cumming et al. |
| 4,865,890 A | 9/1989 | Erlichman |
| 4,906,801 A | 3/1990 | Beasley |
| 4,944,976 A | 7/1990 | Plummer, III |
| 5,023,406 A | 6/1991 | Thornley |
| 5,293,835 A | 3/1994 | Shagoury |
| 5,505,230 A | 4/1996 | Bartholomew |
| 5,566,622 A | 10/1996 | Ziaylek, Jr. et al. |
| 5,626,167 A | 5/1997 | Streit |
| 5,650,594 A | 7/1997 | Urnovitz |
| 5,682,015 A | 10/1997 | Harben |
| 5,794,495 A | 8/1998 | Anderson |
| 5,864,096 A | 1/1999 | Williams et al. |
| 5,873,324 A | 2/1999 | Kaddas et al. |
| 5,878,465 A | 3/1999 | Jenner |
| 5,994,644 A | 11/1999 | Rindoks et al. |
| 6,005,196 A | 12/1999 | Spillyards |
| 6,020,560 A | 2/2000 | Kamel et al. |
| 6,094,792 A | 8/2000 | Frye et al. |
| 6,195,861 B1 | 3/2001 | Frye et al. |
| 6,239,357 B1 | 5/2001 | Mabry, III et al. |
| 6,255,597 B1 | 7/2001 | Bowling et al. |
| 6,730,852 B1 | 5/2004 | Puigcerver et al. |
| 6,812,400 B1 | 11/2004 | Lynch |
| 7,154,034 B2 | 12/2006 | Lynch |
| 7,154,036 B2 | 12/2006 | Lynch |
| 7,297,869 B2 * | 11/2007 | Hiller ................. H01B 17/00 119/174 |
| 7,456,363 B2 | 11/2008 | Nishiguchi et al. |
| 8,067,691 B2 * | 11/2011 | Puigcerver ............ H01B 17/00 174/172 |
| 8,156,693 B2 | 4/2012 | Lynch |
| 8,225,558 B2 | 7/2012 | Lynch |
| 8,618,412 B2 * | 12/2013 | Lynch .................. H01B 17/00 119/713 |
| 8,859,898 B2 | 10/2014 | Frye |
| 2012/0279778 A1 | 11/2012 | Lynch |
| 2013/0264097 A1 | 10/2013 | Lynch |
| 2014/0034380 A1 | 2/2014 | Lynch |
| 2014/0262435 A1 | 9/2014 | Miller et al. |
| 2014/0262485 A1 | 9/2014 | Miller et al. |
| 2015/0008007 A1 * | 1/2015 | Jur ..................... H02G 3/0418 174/68.2 |

FOREIGN PATENT DOCUMENTS

| | | |
|---|---|---|
| DE | 8914320 U1 | 3/1990 |
| DE | 4115866 A1 | 11/1992 |
| DE | 9414366 U1 | 10/1994 |
| DE | 29815864 U1 | 11/1998 |
| FR | 1585394 | 1/1970 |
| IT | 571894 | 1/1958 |
| TW | 501815 U | 9/2002 |

OTHER PUBLICATIONS

"MVLC 15-25 kV Medium Voltage Line cover for Bare Conductors" Raychem Corporation, PII-55066, Rev AA, PCN 360247-000, Effective Date: May 11, 1999 (11 pages).

"Raptor Cover BCIC Wildlife and Asset Protection Products", TE Connectivity Ltd., © 2011, 2012, 2014, 2 pages.

Raychem Electrical Products Division, Raysulate Product Handbook, Third Edition, Chapter 3, "Overhead line insulation tapes and covers," No date, Admitted prior art (16 pages).

"The BirdguarD™ Line of Wildlife Outage Protection Products", Kaddas Enterprises Inc. ©, ® Kaddas Enterprises Inc. 2012, 27 pages.

* cited by examiner

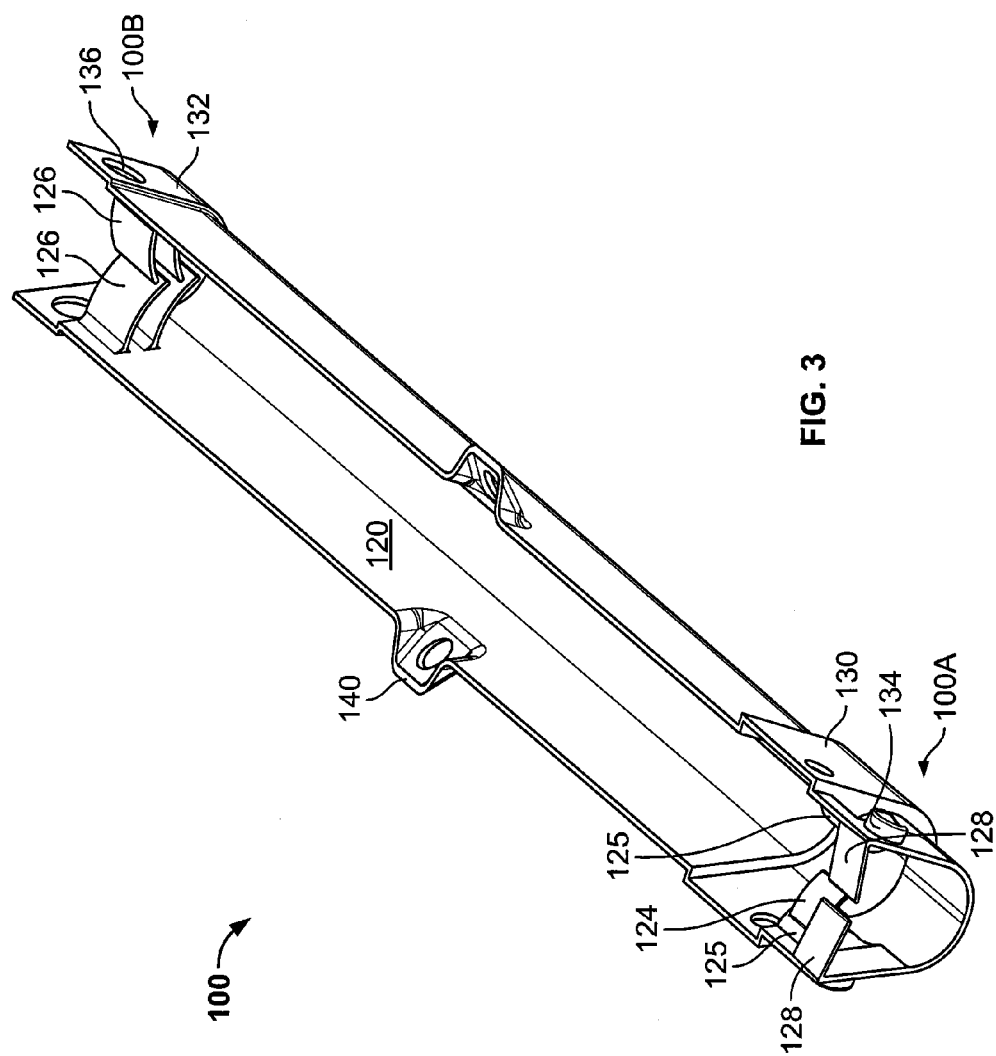

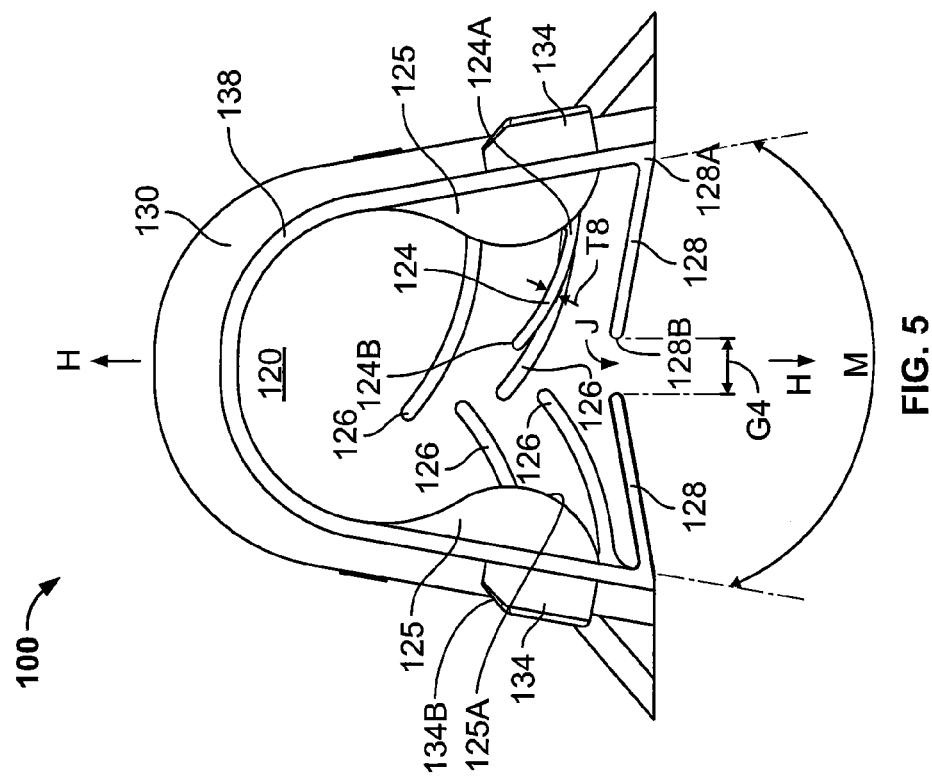
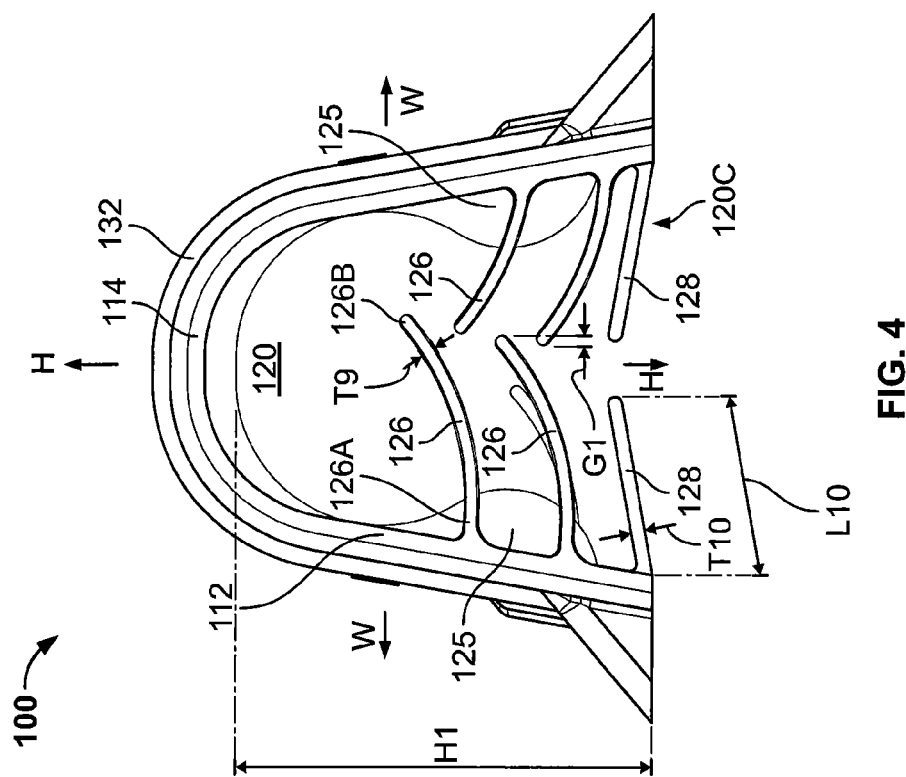

COVERS FOR ELECTRICAL DISTRIBUTION LINES AND INSULATORS AND METHODS AND SYSTEMS INCLUDING SAME

RELATED APPLICATION(S)

The present application claims the benefit of and priority from U.S. Provisional Patent Application No. 62/090,056, filed Dec. 10, 2014, the disclosure of which is incorporated herein by reference in its entirety.

FIELD OF THE INVENTION

The present invention relates to protective covers and, more particularly, to protective covers for distribution lines and insulators, such as power distribution lines and associated insulators.

BACKGROUND OF THE INVENTION

Support structures, such as utility poles, are often used to suspend electrical lines, such as power distribution lines, above the ground. These support structures are generally located outdoors and may be of a variety of different configurations to suspend one or more lines. One problem with such lines, particularly with power distribution lines that transmit electrical power at high voltages, is that birds or other animals may land or climb onto the lines. Such contact of distribution lines by animals, particularly adjacent the support structure, may cause a short or electrical flashover allowing current flow through the animal, which may cause a power outage or other problem with the power distribution system.

For example, it is known that birds from time to time perch on support structures such as utility poles. For certain birds, their wing span is great enough to contact two parallel lines or otherwise create an electrical flashover during takeoff or landing. In addition to harming the bird, such an electrical flashover can also cause a power outage or other problem with the power distribution system.

SUMMARY OF THE INVENTION

According to embodiments of the invention, a protective conductor cover for a distribution line conductor includes an elongate cover body having a longitudinal axis and including first and second opposed, elongate sidewalls. The sidewalls define an axially extending cover channel terminating at axially opposed end openings, and an axially extending bottom opening communicating with the cover channel and terminating at the axially opposed end openings. The protective conductor cover further includes an integral conductor retention tab having a base end attached to the first sidewall and extending laterally from the first sidewall into the cover channel to a free terminal end of the conductor retention tab. The conductor retention tab is configured to elastically deflect and secure the conductor in the cover channel when the conductor is inserted into the cover channel through the bottom opening.

According to method embodiments of the invention, a method for environmentally protecting a distribution line conductor includes providing a protective conductor cover including an elongate cover body having a longitudinal axis and including first and second opposed, elongate sidewalls. The sidewalls define an axially extending cover channel terminating at axially opposed end openings, and an axially extending bottom opening communicating with the cover channel and terminating at the axially opposed end openings. The protective conductor cover further includes an integral conductor retention tab having a base end attached to the first sidewall and extending laterally from the first sidewall into the cover channel to a free terminal end of the conductor retention tab. The method further includes inserting the conductor into the cover channel through the bottom opening such that the conductor retention tab is elastically deflected and the conductor is secured in the cover channel by the conductor retention tab.

According to embodiments of the invention, a protective cover system for environmentally protecting a distribution line conductor and an insulator includes an insulator cover and a protective conductor cover. The insulator cover is configured to be mounted over the insulator. The protective conductor cover includes an elongate cover body having a longitudinal axis and including first and second opposed, elongate sidewalls. The first and second sidewalls define an axially extending cover channel terminating at axially opposed end openings, and an axially extending bottom opening communicating with the cover channel and terminating at the axially opposed end openings. The protective conductor cover further includes an integral conductor retention tab having a base end attached to the first sidewall and extending laterally from the first sidewall into the cover channel to a free terminal end of the conductor retention tab. The conductor retention tab is configured to elastically deflect and secure the conductor in the cover channel when the conductor is inserted into the cover channel through the bottom opening. The protective conductor cover is configured to interlock with the insulator cover.

Further features, advantages and details of the present invention will be appreciated by those of ordinary skill in the art from a reading of the figures and the detailed description of the embodiments that follow, such description being merely illustrative of the present invention.

BRIEF DESCRIPTION OF THE DRAWINGS

FIG. 3 is a bottom perspective view of the protection conductor cover of FIG. 1 from a proximal end of the protective conductor cover.

FIG. 4 is a distal end view of the protective conductor cover of FIG. 1.

FIG. 5 is a proximal end view of the protective conductor cover of FIG. 1.

DETAILED DESCRIPTION OF EMBODIMENTS OF THE INVENTION

Figure 1:
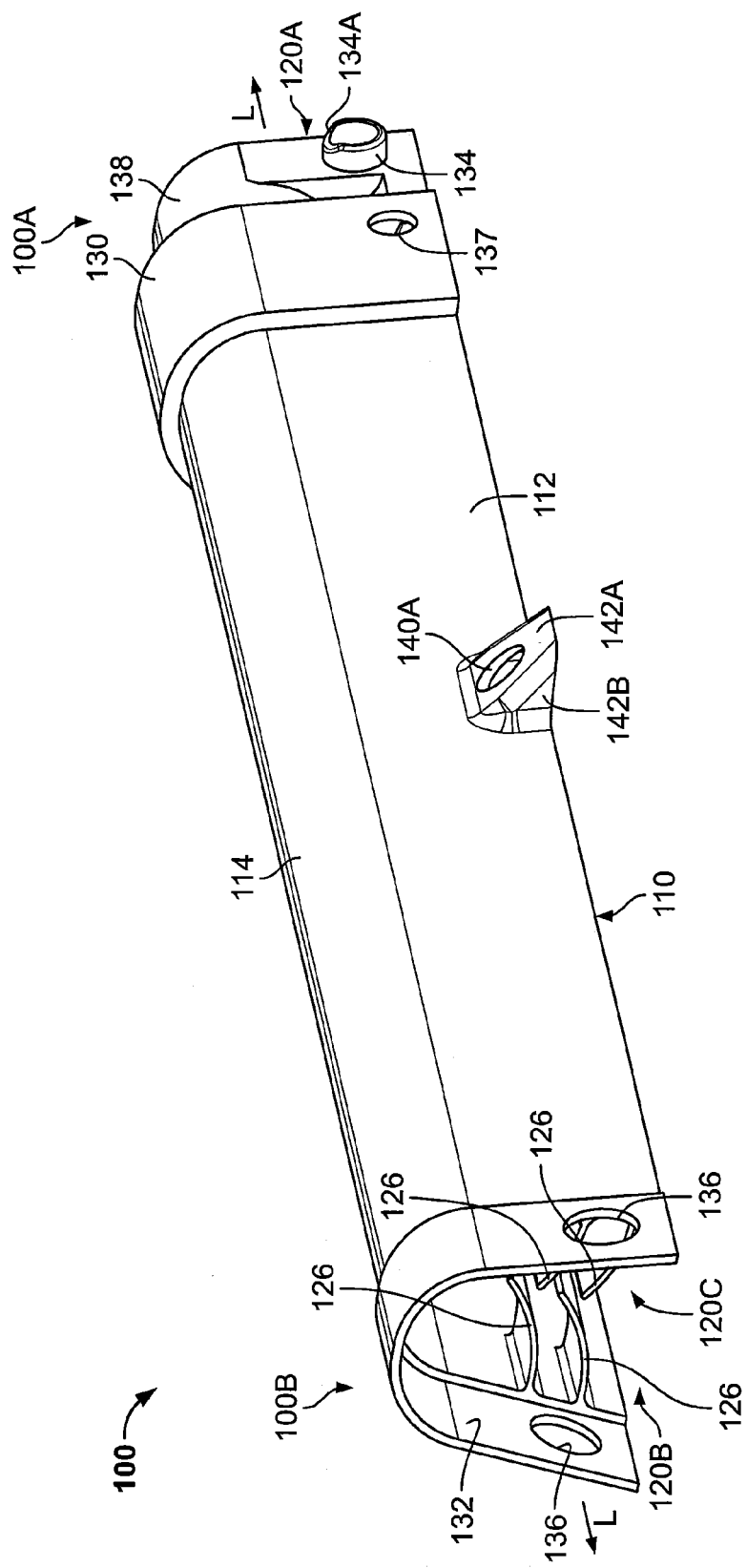
FIG. 1 is a top perspective view of a protective conductor cover according to embodiments of the invention.
Figure 2:
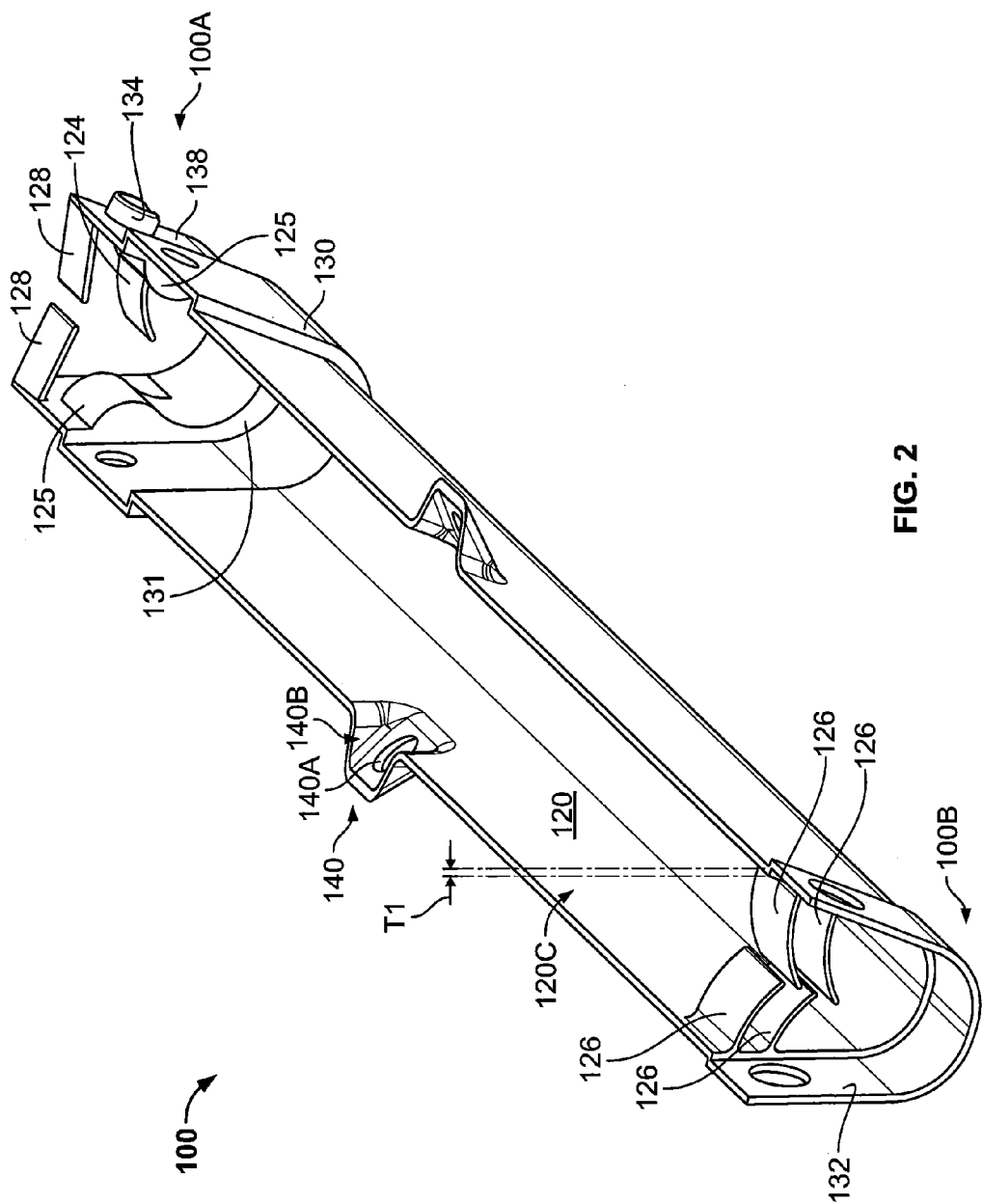
FIG. 2 is a bottom perspective view of the protective conductor cover of FIG. 1 from a distal end of the protective conductor cover.
Figure 6:
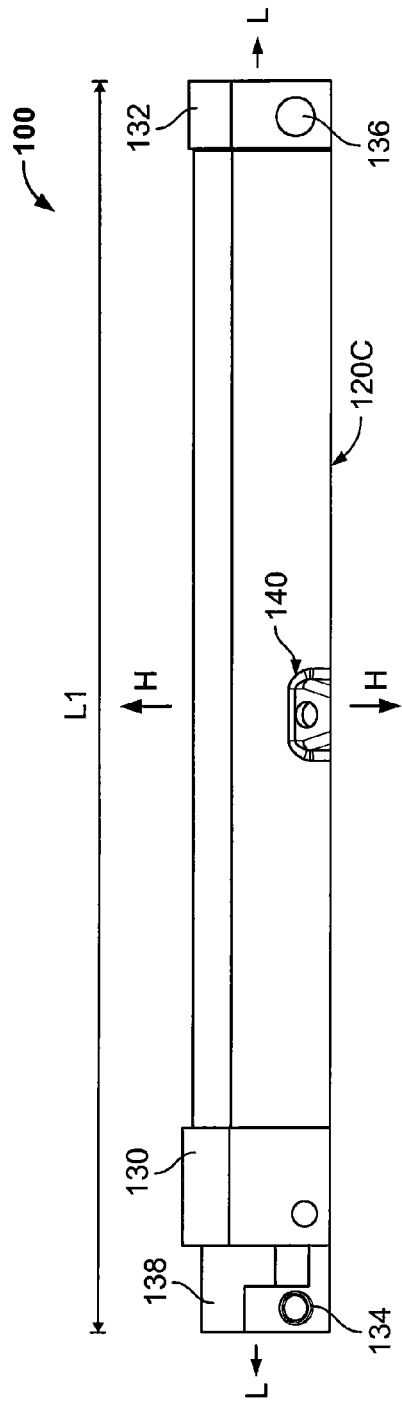
FIG. 6 is a side view of the protective conductor cover of FIG. 1.
Figure 7:
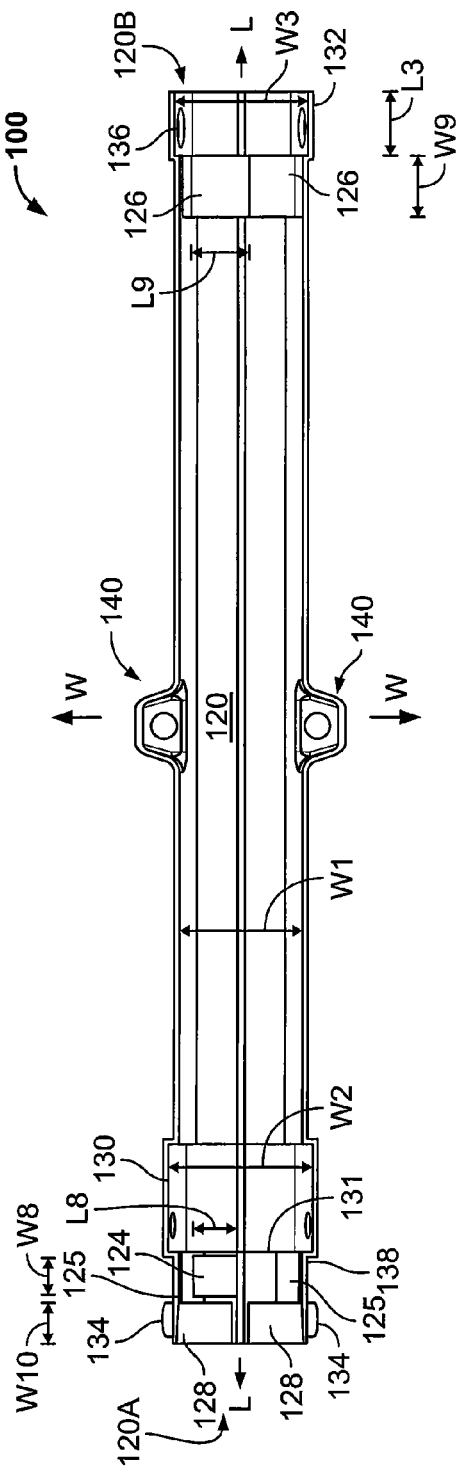
FIG. 7 is a bottom view of the protective conductor cover of FIG. 1.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The term "monolithic" means an object that is a single, unitary piece formed or composed of a material without joints or seams.

Figure 8:
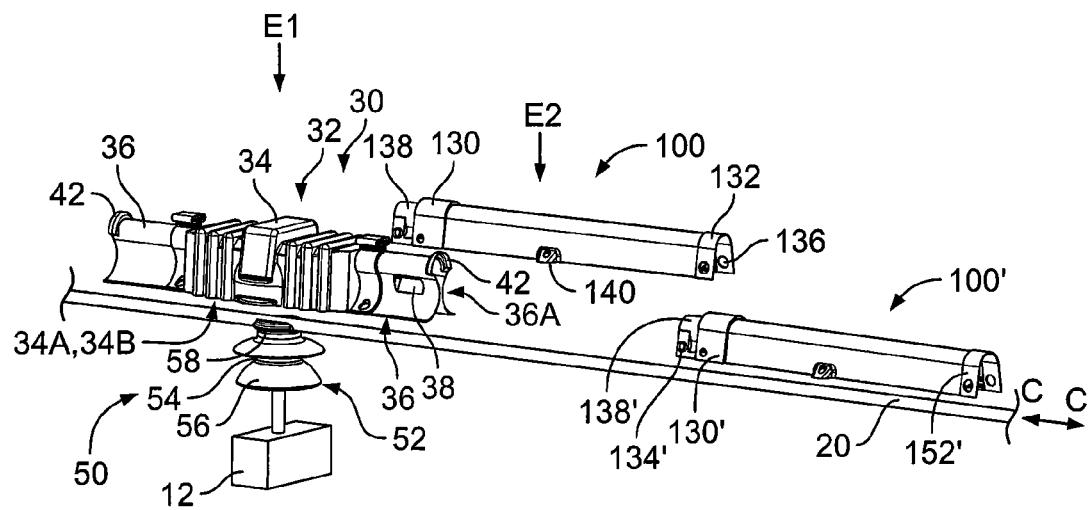
FIG. 8 is an exploded, perspective view of a protective cover system including the protective conductor cover of FIG. 1 being installed on an insulator and an electrical conductor of a power distribution system.
Figure 9:
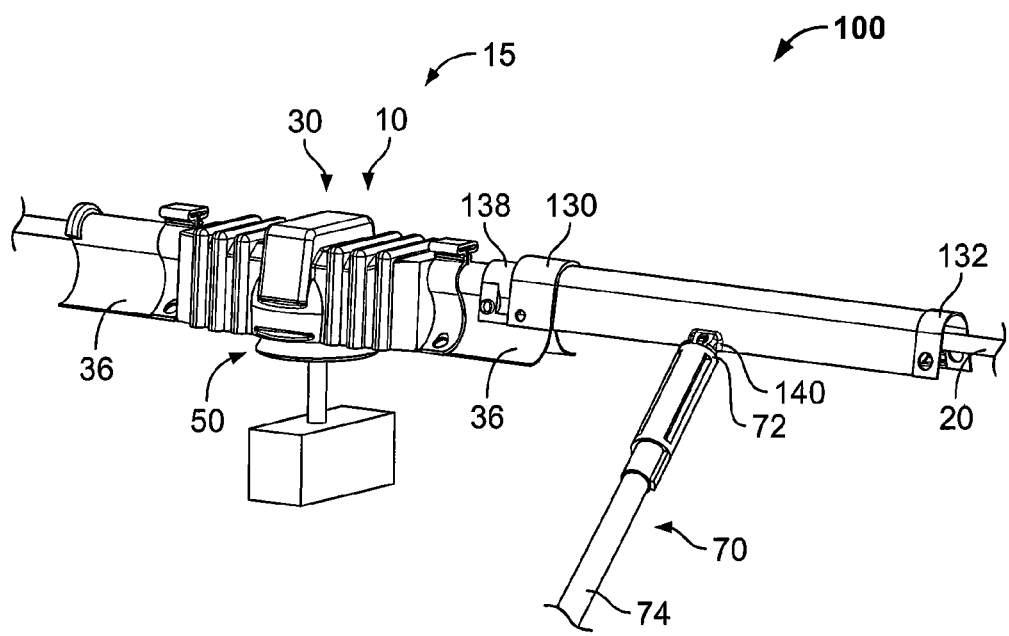
FIG. 9 is a perspective view of the protective cover system partially installed on the insulator and electrical conductor if FIG. 8.
Figure 10:
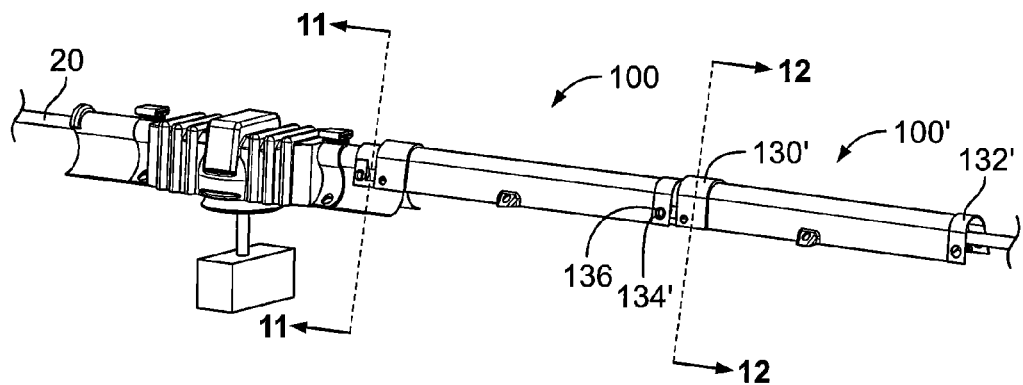
FIG. 10 is a perspective view of the protective cover system fully installed on the insulator and electrical conductor if FIG. 8.
Figure 11:
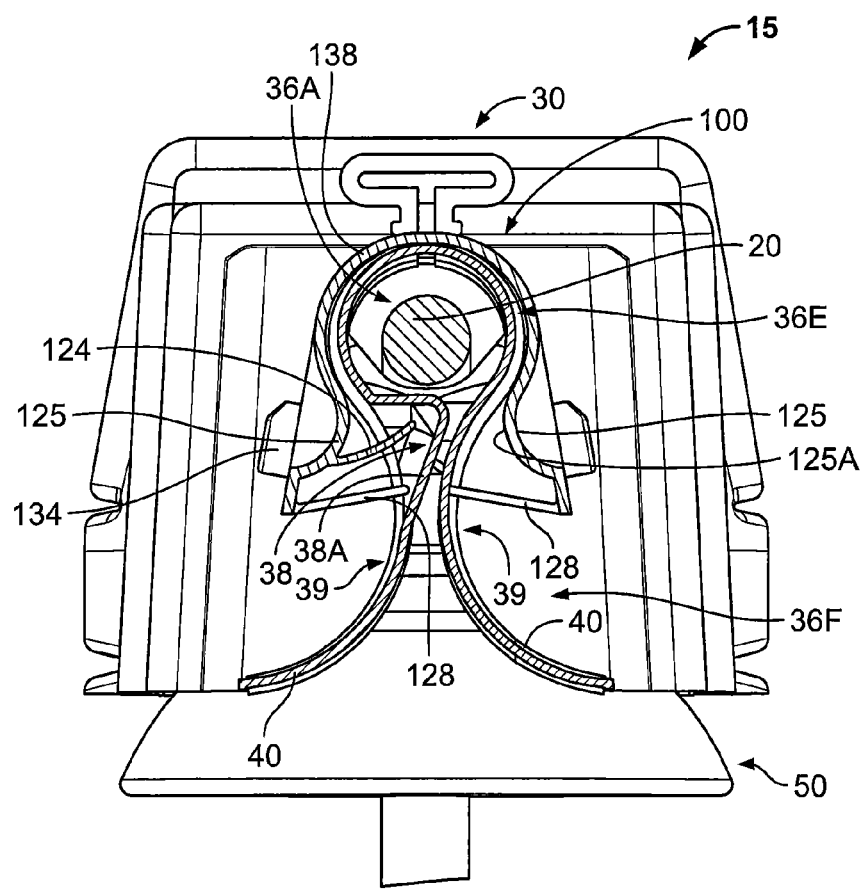
FIG. 11 is a cross-section view of the protective cover system fully installed on the insulator and electrical conductor taken along the line 11-11 of FIG. 10.
Figure 12:
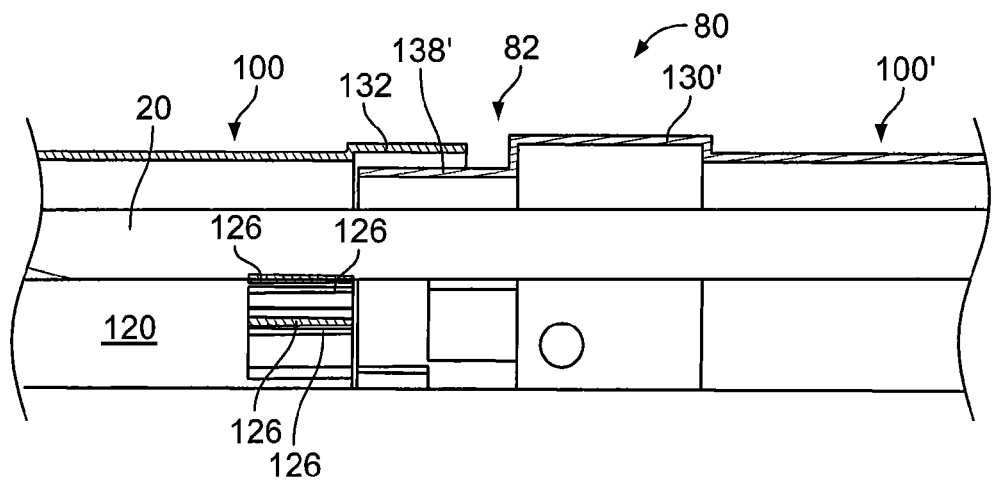
FIG. 12 is a cross-section view of the protective cover system fully installed on the insulator and electrical conductor taken along the line 12-12 of FIG. 10.

With reference to FIGS. 1-12, a protective extension or conductor cover 100 according to embodiments of the invention is shown mounted on a power distribution system to form an environmentally protected conductor assembly 15 (FIGS. 9 and 10). The power distribution system 10 includes a support (e.g., a utility pole) 12 and an insulator 50 mounted on the support 12. An electrical conductor 20 extends across and is mechanically secured to the insulator 50. Either end of the conductor 20 may extend to and electrically connect further components of the system 10. The conductor 20 may be operatively mechanically connected to the insulator 50 in any suitable manner, such mounting methods being well-known to those of skill in the art. One or more of the extension covers 100 may be combined with an insulator cover 30 to form a protective cover system 10 as shown in FIGS. 9 and 10.

As best seen in FIG. 8, the insulator 50 includes an insulator body 52 having alternating core segments 54 and annular skirts 56 that extend radially outwardly from the core segments 54. The insulator body 52 may be formed of a polymer, glass or a ceramic, for example. A conductor mount bracket 58 is mounted on the top end of the insulator body 52. The conductor 20 extends through a lateral passage or seat defined in the bracket 58. As shown, the conductor 20 is a continuous elongate member or segment extending through or over the insulator 50 and through the covers 100, 30. Alternatively, the ends of two or more conductors may be connected to the insulator 50 or the conductor 20 may extend from only one side.

The conductor cover 100 is an elongate member and extends along a cover longitudinal axis L-L from a proximal end 100A to a distal end 100B. The cover 100 includes a body 110 including a connecting wall 114 and integral, opposed, axially extending sidewalls 112 joined by the connecting wall 114. The cover 100 further has a heightwise axis H-H (FIG. 4) extending perpendicular to the axis L-L, and a lateral axis W-W extending perpendicular to each of the axes L-L, H-H. In some embodiments and as shown, the sidewalls 112 flare outwardly in the downward direction.

The walls 112, 114 define an axially extending cover channel 120. The channel 120 terminates at a proximal end opening 120A and a distal end opening 120B. The lower edges of the sidewalls 112 define an axially extending bottom opening 120C into the channel 120 and terminating at the end openings 120A and 120B.

Four integral conductor retention features or tabs 126 extend or project laterally inwardly from each of the sidewalls 112 adjacent the distal end 100B. Each retention tab 126 is cantilevered from a base end 126A, which is directly attached to the sidewall 112, to a free terminal end 126B. According to some embodiments, the retention tabs 126 are integrally molded with the sidewalls 112.

According to some embodiments, the opposed retention tabs 126 collectively extend across the full width of the channel 120. According to some embodiments, the opposed retention tabs 126 laterally overlap across the width of the channel 120 a distance G1 (FIG. 4). In some embodiments, the overlap distance G1 is in the range of from about 0.125 inch to 0.5 inch.

The retention tabs 126 are deflectable along the heightwise axis H-H with respect to the body 110. In some embodiments, the retention tabs 126 are elastically flexible at their bases 126A. In some embodiments, the retention tabs 126 are elastically flexible along their lengths.

In some embodiments and as best seen in FIG. 4, the retention tabs 126 are angled upwardly in the inward direction. In some embodiments, and as best seen in FIG. 3, the retention tabs 126 have an arcuate or curvilinear profile in the lateral axis W-W.

A radially enlarged, U-shaped proximal end flange 130 extends radially from the body 110 proximate and axially inset from the proximal end 100A. An extension section 138 of the body 110 extends axially from the flange 130 to the proximal end 100A. A ledge 131 is defined at the interface between the flange 130 and the extension section 138. Two integral connector posts 134 extend laterally outwardly from opposed sides of the extension section 138. The top edge of each post 134 has a beveled or ramped surface 134A. A pair of opposed connector openings 137 extend laterally through opposed sides of the flange 130.

A cover coupling feature or tab 124 extends or projects laterally inwardly from one of the sidewalls 112 in the extension section 138 adjacent the proximal end 100A. Each coupling tab 124 is cantilevered from an anchor end 124A, which is directly attached to the sidewall 112, to a free terminal end 12413. According to some embodiments, the coupling tab 124 is integrally molded with the sidewall 112.

According to some embodiments, the coupling tab 124 extends only part of the way across the width of the channel 120. According to some embodiments, the coupling tab 124 extends 25 to 75 percent of the distance across the width of the channel 120.

The coupling tab 124 is deflectable along the heightwise axis H-H with respect to the body 110. In some embodiments, the coupling tab 124 is elastically flexible at its base 124A. In some embodiments, the coupling tab 124 is elastically flexible along its length.

In some embodiments and as best seen in FIG. 5, the coupling tab 124 is angled upwardly in the inward direction. In some embodiments, and as best seen in FIG. 4, the coupling tab 124 has an arcuate or curvilinear profile in the lateral axis W-W.

A coupling support feature 125 projects laterally inwardly from each of the sidewalls 112. Each coupling support feature 125 has an engagement surface 125A having a convex shape or profile facing the channel 120. In some embodiments, the convex profile of the engagement surface 125A is substantially congruent to a corresponding engagement surface of a recess 39 of the insulator cover 30 having a concave shape or profile. In some embodiments and as shown, the anchor end of the coupling tab 124 is directly attached (and may be integrally molded with) one of the coupling support features 125 so that the coupling tab 124 projects laterally inwardly from the engagement surface 125A thereof.

A pair of opposed supplemental coupling tabs 128 extend or project laterally inwardly from each of the sidewalls 112 in the extension section 138. Each supplemental coupling tab 128 is cantilevered from a base end 128A, which is directly attached to the sidewall 112, to a free terminal end 128B. According to some embodiments, the supplemental coupling tabs 128 are integrally molded with the sidewalls 112.

According to some embodiments, the supplemental coupling tabs 128 do not collectively extend across the full width of the channel 120, and a gap J (FIG. 5) is defined between their respective ends 128B. According to some embodiments, the width G4 (FIG. 5) of the gap J is in the range from about 0.25 to 0.75 inch.

A radially enlarged, U-shaped distal end flange 132 extends radially from the distal end 100B of the body 110. A pair of connector openings 136 extend laterally through opposed sides of the flange 132.

The cover 100 further includes integral handling features or tabs 140. Each handling tab 140 includes a front wall 142A and opposed side walls 142B defining a downwardly opening handling recess 140B therein. The front walls 142A flare outwardly in a downward direction (i.e., taper inwardly from their terminal edges toward the top of the cover 100). Each handling tab 140 includes a handling opening 140A in its front wall 142A.

According to some embodiments, the axial length L1 (FIG. 6) of the channel 120 is in the range of from about 24 to 48 inches.

According to some embodiments, the width W1 (FIG. 7) of the channel 120 is in the range of from about 2.5 to 4.5 inches.

According to some embodiments, the height H1 (FIG. 4) of the channel 120 is in the range of from about 3 to 5 inches.

According to some embodiments, the sidewalls 112 are inclined to form an angle M (FIG. 5) in the range of from about 10 to 30 degrees.

According to some embodiments, the interior width W2 (FIG. 7) of the proximal end flange 130 is in the range of from about 3 to 4 inches.

According to some embodiments, the axial length of the proximal end flange 130 is in the range of from about 1.5 to 2.5 inches.

According to some embodiments, the interior width W3 (FIG. 7) of the distal end flange 132 is in the range of from about 3.25 to 4.25 inches.

According to some embodiments, the axial length L3 (FIG. 7) of the distal end flange 132 is in the range of from about 1.75 to 2.75 inches.

According to some embodiments, the laterally extending length L8 (FIG. 7) of the coupling tab 124 is in the range of from about 0.75 to 1.5 inches.

According to some embodiments, the thickness T8 (FIG. 5) of the coupling tab 124 is in the range of from about 0.07 to 0.125 inch.

According to some embodiments, the axially extending width W8 (FIG. 7) of the coupling tab 124 is in the range of from about 0.75 to 1.5 inches.

According to some embodiments, the laterally extending length L9 (FIG. 7) of each retention tab 126 is in the range of from about 1 to 2 inches. In some embodiments, the retention tabs 126 have different lengths from one another. In some embodiments, the retention tabs 126 on one sidewall 112 are longer than the retention tabs 126 on the other sidewall 112, so that the location of the overlap between the opposed retention tabs 126 is off center (see, e.g., FIG. 4).

According to some embodiments, the thickness T9 (FIG. 4) of each retention tab 126 is in the range of from about 0.07 to 0.125 inch.

According to some embodiments, the axially extending width W9 (FIG. 7) of each retention tab 126 is in the range of from about 1 to 2 inches.

According to some embodiments, the laterally extending length L10 (FIG. 4) of each supplemental coupling tab 128 is in the range of from about 0.75 to 1.25 inches.

According to some embodiments, the thickness T10 (FIG. 4) of each supplemental coupling tab 128 is in the range of from about 0.07 to 0.125 inch.

According to some embodiments, the axially extending width W10 (FIG. 7) of each supplemental coupling tab 128 is in the range of from about 0.75 to 1.25 inches.

The cover 100 may be formed of any suitable electrically insulating material. According to some embodiments, the cover 100 is formed of a rigid or semi-rigid polymeric material. According to some embodiments, the cover 100 is formed of a rigid or semi-rigid polymeric material selected from the group consisting of polyolefins and polyolefin copolymers. According to some embodiments, the cover 100 is formed of a track resistant, insulating grade, UV stable polymer. According to some embodiments, the cover 100 is formed of a material having a secant modulus in the range of from about 29,000 to 120,000 psi. According to some embodiments, the material of the cover 100 has a tensile strength in the range of from about 2450 to 3500 psi. According to some embodiments, the cover 100 is unitarily and integrally formed. According to some embodiments, the cover 100 is unitarily molded. According to some embodiments, the cover 100 is unitarily injection molded. According to some embodiments, the cover 100 is monolithic.

According to some embodiments, the cover 100 has a thickness T1 (FIG. 2) in the range of from about 0.1 inch to 0.2 inch. In some embodiments, the thickness of the cover 100 is substantially uniform and varies by no more than about 10%.

According to some embodiments, the cover 100 is formed of a polymeric material that remains flexible down to a temperature of at least −40 degrees Celsius.

The insulator cover 30 has a cover body 32 including a main body or shroud portion 34 and a pair of opposed, laterally extending, generally inverted U-shaped body extensions or legs 36. Each leg 36 includes laterally opposed side walls 40. The insulator cover 30 is adapted to receive the insulator 5Q and portions of the conductor 20 such that at least a portion of the conductor 20 generally extends along a lengthwise conductor axis C-C. The main body 34 defines an insulator cavity 34A and a lower opening 3413 to receive the insulator 50. The legs 36 each define a leg channel 36A to receive the conductor 20. Each leg channel 36A is downwardly open and terminates at the insulator cavity 34A and at a distal end opening.

The upper portion 36E of each leg 36 has a relatively large width and the sidewalls 40 taper to a relatively narrow region 36F and then flare outwardly at their lower ends.

Each leg 36 includes a laterally inward extending recess 38 in one side wall 40 having an engagement surface 38A having a generally V-shaped profile. Each leg 36 also includes a laterally inward extending recess 39 in the opposing side wall 40 having an engagement surface having a generally U-shaped or concave profile.

A semi-annular or C-shaped rib or flange 42 projects outwardly from the top surface of each leg 36 at its terminal face end.

Generally, the main body 34 provides coverage for the electrically conductive components of the insulator 50 and the overlying portion of the conductor 20, and the legs 36 provide coverage for more extant opposed portions of the conductor 20.

The insulator cover 30 may be formed of any suitable electrically insulating material. According to some embodiments, the insulator cover 30 is formed of a material as described above for the conductor cover 100.

The cover 100 and the cover system 10 may be mounted on the insulator 50 and the conductor 20 in the following manner. According to some embodiments and as discussed below, the cover 100 can be installed on a "hot" or powered line using a hot stick 70 or other installation tool. The exemplary hot stick includes an electrically insulating handle 72 and an engagement or grabbing device 74 on the affixed to an end of the handle 72. Suitable hot sticks may include, for example, a Telescoping or Shotgun type hot stick available from Hastings, AB Chance or Salisbury. Alternatively, the cover 100 can be installed on a "hot" or powered line using gloves or the like.

The conductor 20 is first installed on the insulator 50 in conventional or other suitable manner as shown in FIG. 8. The insulator cover 30 is then forced downwardly in a downward direction E1 onto the conductor 20 and the arrestor 50 such that the insulator 50 is received into the cavity 34A and portions of the conductor 20 are received into the channels 36A of the legs 36.

The conductor cover 100 is forced onto the conductor 20 in a downward direction E2 such that the conductor 20 is received into the channel 120 through the bottom opening 120C. The installation direction E2 is transverse to, and in some embodiments perpendicular to, the longitudinal axis L-L and the heightwise axis H-H. As the conductor 20 moves into the channel 120 toward the connecting wall 114, the retention tabs 126 elastically deflect upwardly and then recover to close about and capture the conductor 20. The retention tabs 126 thereby resist, limit or prevent axial vertical displacement and removal of the cover 100 relative to and from the cover 30.

Additionally, the leg 36 of the insulator cover 30 is received in extension section 138 and the proximal end flange 130. The coupling tab 124 is received or seated in the recess 38 of the insulator cover leg 36. The coupling support features 125 are received and seated in the opposed recesses 39 of the leg 36. In some embodiments, the engagement surfaces 125A and recesses 39 substantially mate. The interlocks between the coupling tab 124 and the leg recess 38 and the features 125 and the recesses 39 resist, limit or prevent vertical and axial displacement of the conductor cover 100 relative to the insulator cover 30.

The flange 42 interlocks with the ledge 131 to limit or prevent axial displacement of the cover 100 relative to the cover 30.

Additionally, the supplemental coupling tabs 128 elastically deflect to slide over the enlarged portion 36E and are received in the narrow region 36F of the leg 36. The interlock between the tabs 128 and the enlarged portion 36E resists relative vertical displacement between the covers 100, 30 and also resists relative roll or rotation between the covers 100, 30 (e.g., about the axis C-C) that might otherwise cause disengagement between the interlocking features 124, 38, 125, 39.

The handling openings 140A can be gripped by the hotstick 70 or other tool to install, remove or otherwise manipulate the cover 100.

Removal of the cover 100 may be accomplished by forcing the cover 100 off the insulator cover 30 and conductor 20 in the direction opposite the installation direction E2 using a hot stick 70 or other tool, for example, engaging one of the hot stick engagement features 140. Similarly, removal of the insulator cover 30 may be accomplished by forcing the insulator cover 30 off the insulator 50 and conductor 20 in the direction opposite the installation direction E1.

A second conductor cover 100' can be installed on the conductor 20 and the cover 100 to form an extended string or conductor cover assembly 80. The cover 100' is constructed in the same manner as, and in some embodiments is substantially identical to, the cover 100. The cover 100 is forced down onto the cover 100' such that the proximal end extension section 138' of the cover 100' is received and nested in the distal end flange 132 of the cover 100 as shown in FIGS. 8-10, forming a cover joint 82. As the distal end flange 132 is slid onto the proximal end flange 130', the posts 134' of the extension section 138' (aided by the ramps 134A) slide into and interlock with the holes 136 of the distal end flange 132. Any desired number of additional conductor covers 100 can be further serially attached to the distal end flange 132' of the cover 100' to form a conductor cover assembly of desired length on the conductor 20.

The conductor covers 100 can be installed on one or both of the legs 36 to extend the effective protection coverage.

The conductor cover or covers 100 can be used without an insulator cover to environmentally protect a length of conductor 20. Multiple conductor covers 100 used in this manner can be linked to form an extended string or conductor cover assembly 80 as described above.

The cover 100 and system 10 can provide a number of advantages. The conductor retention features 126 allow for a secure connection to any size conductor within a wide size range by one conductor cover size without using any additional fasteners.

Any desired conductor coverage length can be achieved by the modular aspect of the conductor cover 100. The conductor cover 100 is configured such that any number of covers 100 can be assembled to each other to provide any required coverage distance.

Several aspects of the cover 100 enable or facilitate its installation on an electrically energized connection using a hotstick. The configuration of the cover 100 and the automatic operation of the retention features 126 enable effective installation by a installer on the ground below an aerial conductor 220. The handling features 140 are adapted for operative engagement using a hotstick.

The covers 100 can be identical so that only one mold is need for manufacture, saving costs.

The cover 100 may be adapted for use with a prescribed range of conductor sizes. According to some embodiments, for any conductor 20 within the prescribed range of sizes, the insertion force required to install the cover 100 on the conductor as described above is in the range of from 5 to 25 lbs.

The insulator cover 30 and one or more of the conductor covers 100 may be provided as a matched combination or kit.

Figure 13:
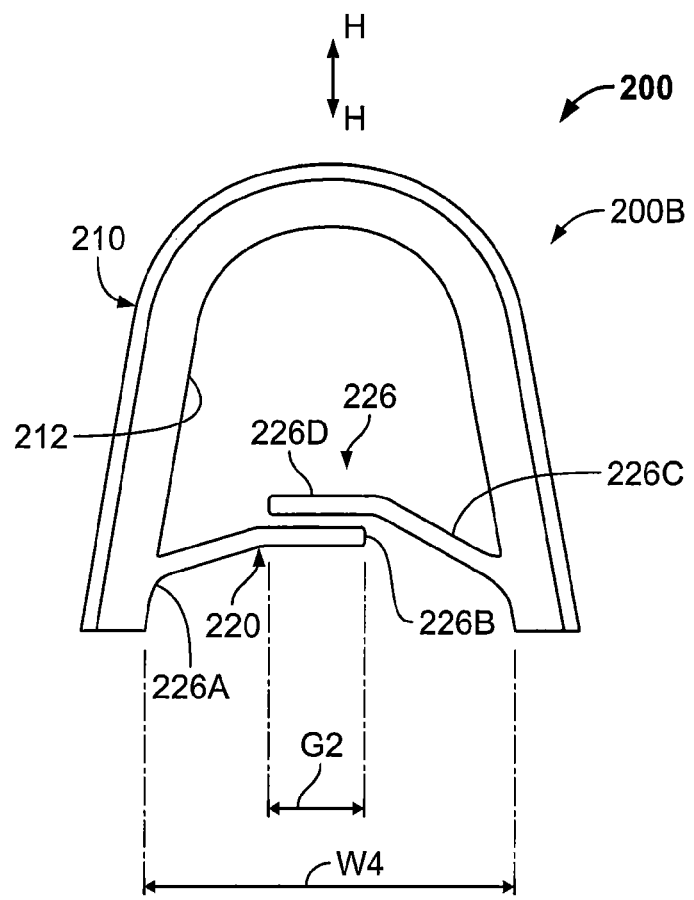
FIG. 13 is a proximal end view of a protective conductor cover according to further embodiments of the invention.

With reference to FIG. 13, and end view of a conductor cover 200 according to further embodiments is shown therein. The cover 200 may be constructed identically to the cover 100 except that the conductor retention features 126 are replaced with a pair of conductor retention tabs 226.

The retention tabs 226 extend or project laterally inwardly from each of the sidewalls 212 adjacent the distal end 200B. Each retention tab 226 is cantilevered from a base end 226A, which is directly attached to the sidewall 212, to a free terminal end 226B. According to some embodiments, the retention tabs 226 are integrally molded with the sidewalls 212.

The opposed retention tabs 226 extend across the full width of the channel 120 and laterally overlap across the width of the channel 120 a substantial distance G2. In some embodiments, the overlap distance G2 is in the range of from about 0.25 to 1 inch. In some embodiments, the overlap distance G2 is in the range of from about 5 to 50 percent of the width W4 of the cover channel 220.

The retention tabs 226 are deflectable along the heightwise axis H-H with respect to the body 210. In some embodiments, the retention tabs 226 are elastically flexible at their bases 226A. In some embodiments, the retention tabs 226 are elastically flexible along their lengths.

In some embodiments, the retention tabs 226 each include a sloped portion 226C that is angled upwardly in the inward direction and a horizontal portion 226D that lies in a plane substantially perpendicular to the longitudinal and heightwise axes of the cover 200. The horizontal portion 226D laterally overlap.

The cover 200 can be used in the same manner as the cover 100 with the retention tabs 226 serving to capture the conductor 20 in the cover channel 220.

Covers formed in accordance with the present invention may be used with insulators and conductors of different types, including, for example, insulators of surge arrestors.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A protective conductor cover for a distribution line conductor, the protective conductor cover comprising:
   an elongate cover body having a longitudinal axis and including first and second opposed, elongate sidewalls defining:
      an axially extending cover channel terminating at axially opposed end openings;
      an axially extending bottom opening communicating with the cover channel and terminating at the axially opposed end openings; and
   an integral conductor retention tab having a base end attached to the first sidewall and extending laterally from the first sidewall into the cover channel to a free terminal end of the conductor retention tab;
   wherein the conductor retention tab is configured to elastically deflect and secure the conductor in the cover channel when the conductor is inserted into the cover channel through the bottom opening.

2. The protective conductor cover of claim 1 wherein:
   the protective conductor cover further includes a second integral conductor retention tab having a base end attached to the second sidewall and extending laterally from the second sidewall into the cover channel to a free terminal end of the second conductor retention tab;
   the second conductor retention tab is located opposite the first conductor retention tab and is configured to elastically deflect and secure the conductor in the cover channel in cooperation with the first conductor retention tab when the conductor is inserted into the cover channel through the bottom opening.

3. The protective conductor cover of claim 2 wherein the first and second conductor retention tabs are integrally molded and monolithic with the first and second sidewalls.

4. The protective conductor cover of claim 2 wherein the first and second conductor retention tabs collectively extend laterally across an entire width of the cover channel.

5. The protective conductor cover of claim 4 wherein the first and second conductor retention tabs laterally overlap across the width of the cover channel.

6. The protective conductor cover of claim 5 wherein the first and second conductor retention tabs laterally overlap by an overlap distance in a range of from 0.125 to 0.5 inch.

7. The protective conductor cover of claim 2 wherein the first and second conductor retention tabs are elastically flexible along their laterally extending lengths.

8. The protective conductor cover of claim 2 wherein the first and second conductor retention tabs each extend at an upward angle away from the bottom opening.

9. The protective conductor cover of claim 8 wherein the first and second conductor retention tabs are each curved upwardly away from the bottom opening.

10. The protective conductor cover of claim 2 wherein:
the first and second conductor retention tabs each include a sloped portion and a substantially horizontal portion, and wherein the sloped portion extends from the base end to the horizontal portion and the horizontal portion extends from the sloped portion to the free terminal end; and
the horizontal portions of the first and second conductor retention tabs laterally overlap across a width of the cover channel.

11. The protective conductor cover of claim 1 including:
at least one connector hole defined in at least one of the first and second sidewalls proximate a first end of the cover body;
at least one connector post defined in at least one of the first and second sidewalls proximate a second end of the cover body opposite the first end;
wherein the connector post is arranged and configured to receive and interlock with a connector hole of a first adjacent protective conductor cover to serially secure the first adjacent protective conductor cover to the protective conductor cover; and
wherein the connector hole is arranged and configured to receive and interlock with a connector post of a second adjacent protective conductor cover to serially secure the second adjacent protective conductor cover to the protective conductor cover.

12. The protective conductor cover of claim 1 wherein:
the protective conductor cover further includes an integral cover coupling tab having a base end attached to one of the first and second sidewalls and extending laterally from said one of the first and second sidewalls into the cover channel to a free terminal end of the cover coupling tab; and
the cover coupling tab is configured to elastically deflect and secure the cover body to an adjacent insulator cover.

13. The protective conductor cover of claim 12 wherein the cover coupling tab is integrally molded and monolithic with said one of the first and second sidewalls.

14. The protective conductor cover of claim 12 wherein the cover coupling tab extends at an upward angle away from the bottom opening.

15. The protective conductor cover of claim 12 wherein there is no cover coupling tab extending from the sidewall opposite said one of the first and second sidewalls.

16. The protective conductor cover of claim 12 wherein:
the protective conductor cover includes first and second integral coupling support features on the first and second sidewalls, respectively; and
the first and second coupling support features each project laterally inwardly into the cover channel and have a convex engagement surface configured to engage the adjacent insulator cover.

17. The protective conductor cover of claim 12 further including:
a first supplemental coupling tab having a base end attached to the first sidewall and extending laterally from the first sidewall into the cover channel to a free terminal end of the first supplemental coupling tab; and
a second supplemental coupling tab having a base end attached to the second sidewall and extending laterally from the second sidewall into the cover channel to a free terminal end of the second supplemental coupling tab;
wherein the second supplemental coupling tab is located opposite the first supplemental coupling tab; and
wherein the first and second supplemental coupling tabs are configured to elastically deflect and cooperatively secure the protective conductor cover to the adjacent insulator cover.

18. The protective conductor cover of claim 17 wherein the free ends of the first and second supplemental coupling tabs defined a gap therebetween.

19. A method for environmentally protecting a distribution line conductor, the method comprising:
providing a protective conductor cover including:
an elongate cover body having a longitudinal axis and including first and second opposed, elongate sidewalls defining:
an axially extending cover channel terminating at axially opposed end openings;
an axially extending bottom opening communicating with the cover channel and terminating at the axially opposed end openings; and
an integral conductor retention tab having a base end attached to the first sidewall and extending laterally from the first sidewall into the cover channel to a free terminal end of the conductor retention tab; and
inserting the conductor into the cover channel through the bottom opening such that the conductor retention tab is elastically deflected and the conductor is secured in the cover channel by the conductor retention tab.

20. A protective cover system for environmentally protecting a distribution line conductor and an insulator, the protective cover system comprising:
an insulator cover configured to be mounted over the insulator; and
a protective conductor cover comprising:
an elongate cover body having a longitudinal axis and including first and second opposed, elongate sidewalls defining:
an axially extending cover channel terminating at axially opposed end openings;
an axially extending bottom opening communicating with the cover channel and terminating at the axially opposed end openings; and
an integral conductor retention tab having a base end attached to the first sidewall and extending laterally from the first sidewall into the cover channel to a free terminal end of the conductor retention tab;
wherein the conductor retention tab is configured to elastically deflect and secure the conductor in the cover channel when the conductor is inserted into the cover channel through the bottom opening; and wherein the protective conductor cover is configured to interlock with the insulator cover.

* * * * *

UNITED STATES PATENT AND TRADEMARK OFFICE
CERTIFICATE OF CORRECTION

PATENT NO.         : 9,702,485 B2                                      Page 1 of 1
APPLICATION NO.    : 14/956607
DATED              : July 11, 2017
INVENTOR(S)        : Hiller et al.

It is certified that error appears in the above-identified patent and that said Letters Patent is hereby corrected as shown below:

In the Specification

Column 5, Line 30: Please correct "12413" to read -- 124B --

Column 7, Line 39: Please correct "5Q" to read -- 50 --

Column 7, Line 42: Please correct "3413" to read -- 34B --

Signed and Sealed this
Fifth Day of June, 2018

Andrei Iancu
*Director of the United States Patent and Trademark Office*